United States Patent [19]

Sato et al.

[11] 4,346,391
[45] Aug. 24, 1982

[54] RECORDER

[75] Inventors: Yuji Sato; Shoji Koizumi, both of Kobe, Japan

[73] Assignee: Furuno Electric Co., Ltd., Hyogo, Japan

[21] Appl. No.: 193,973

[22] Filed: Oct. 6, 1980

[30] Foreign Application Priority Data

Oct. 11, 1979 [JP] Japan .......................... 54-141113[U]

[51] Int. Cl.³ ..................... G01D 15/34; B65H 17/02; B65H 27/00
[52] U.S. Cl. ............................... 346/136; 242/67.3 R; 242/76
[58] Field of Search .................. 346/136; 242/67.1 D, 242/67.3 R, 76

[56] References Cited

U.S. PATENT DOCUMENTS 2,690,883 10/1954 Barker et al. .................. 242/67.3 R
3,460,158 8/1969 Bravenec ......................... 346/136
3,759,433 9/1973 Gerber ........................... 242/67.3 R
3,792,825 2/1974 Kampf ........................... 346/136 X Primary Examiner—George H. Miller, Jr.
Attorney, Agent, or Firm—Jordan and Hamburg

[57] ABSTRACT

The present invention is directed to a recorder having recorded paper mounted to advance from a body with a curved surface to a roller lengthwise, and with at least one recording stylus mounted to move transversally across the width of the recording paper as it moves lengthwise. Additionally, a lead piece is placed in the path of the recording stylus extending over the edge of the recording paper to smoothly lead the recording stylus into the recording paper. This lead piece is rotatably supported on the recorder, with a means for continuously biasing the lead piece in a direction to withdraw the lead piece from the path of the recording paper, along with an obstruction positioned to push the biasing means to retain the lead piece over said recording paper.

9 Claims, 10 Drawing Figures

RECORDER

BACKGROUND OF THE INVENTION

This invention relates to a recorder in which a recording stylus is mounted on a moving body and repeatedly traverses the width of recording paper, wherein the paper is moved progressively lengthwise in a direction perpendicular to the direction of stylus scan. More in particular, the invention relates to a recorder having a recording stylus lead piece placed to extend over the upper edge of the recording paper in the stylus path, to prevent the recording paper from being torn or ripped.

Hereinafter, the present invention will be disclosed as embodied in the recorder of an underwater detection system, such as an echo sounder, although the invention is not limited to this type of system.

Recorders such as shown in FIGS. 1, and 2 have been proposed and widely used in echo sounding systems. Recorders shown in FIGS. 3 and 4 have been recently developed and unknown.

Referring to FIG. 1, a stylus assembly 1 comprises a conducting piece fastened to an endless belt 2. A recording stylus 3 is fixed to one end of the conducting piece, and a collector stylus 4 is fixed to the other end thereof. The collector stylus 4 slides along a contact rail 5 to which received echo signals are applied, while the recording stylus 3 moves across the width of electrically sensitive recording paper 6. In underwater detection systems, two types of electrically sensitive papers are often used. So-called dry paper consists of a very thin layer of metal (e.g. aluminum) covered with a conductive layer (e.g. carbon). When a current passes from a recording stylus through the conductive and metal layers to an electrically grounded metal roller or plate behind the paper, the upper layer is burnt away and the layer beneath it, which has a different color, then becomes visible. So-called moist paper produces a chemical change when a current passes through it from a stylus, so that discolouration becomes visible at the spot through which the current passes. The endless belt 2 extends around a driving pulley 7 and a driven pulley 8, and is driven at uniform speed by a motor through a reduction gear mechanism contained in a box 9, a driving shaft 10 and the driving pulley 7. The recording stylus 3 thus repeatedly moves across the recording paper 6, in synchronism with the sequence of the sonar signals transmitted in the water, so that a profile of the bottom of the sea and fish schools are recorded upon the paper 6. A pulling roller 12 is rotatably supported by parallel side plates 11, 11, the roller 12 being rotated by a suitable motor, via a gear mechanism. A pressing roller 13 is rotatably held by the plates 11 and mounted to press the recording paper against the pulling roller 12. A take-up reel 14 is rotatably supported by the plates 11 and driven by a motor. The recording paper is drawn from a paper roll mounted on a feed reel and advanced over a sending roller, a plate 15 horizontally maintained between the plates 11, and between the pulling and pressing rollers 12, 13, and is thence wound on the take-up reel 14. A recording stylus lead piece 16 is placed in the path of the stylus 3 extending over both of the plate 15 and the upper portion of the recording paper 6 sufficiently close thereto that it almost presses the paper 6 against the plate 15, so that the stylus can smoothly move onto the recording paper without causing any damage thereto.

Referring to FIG. 2, the top plate 15 is supported by the side plates 11 therebetween, and can be turned up around the axis of the pulling roller 12 in the direction of an arrow. A sending roller 18 is rotatably supported by the plate 15 at the right-hand end thereof. Suspension plates 19 extend downwardly from the side of the plate 15, to face each other. A feed reel 20 is rotatably supported between the suspension plates 19. Drive motor 21 for the driving pulley 7 and the pulling roller 12 are fixed to one of the plates 11. The recording paper 6 is drawn out of a paper roll mounted on the feed reel 20 over the roller 18, the plate 15 and the pulling roller 12, and is wound on the take-up reel 14. The recording stylus 3 moves across the recording paper 6 over the sending roller 18, which is electrically grounded. Currents dependent upon received echo signals flow from the stylus 3 to the roller 18 through the recording paper 6, so that corresponding marks or images are produced thereon. The recording stylus lead piece 16 is placed in the path of the recording stylus at the upper part of the sending roller 18.

When a new paper roll must be mounted on the feed reel positioned under the plate 15, the plate is turned up about the axis of the pulling roller 12 and held inclined as shown in FIG. 2.

Referring to FIGS. 3 and 4, in another recorder, each of the gears 23, 24 is fitted to one end of an axle rotatably supported by the plate 11. Each plate 25 or 26 is fixed at one end thereof to one of the axles, or to the side of one of the gears 23, 24. The sending roller 18 and the pulling roller 12 are respectively rotatably supported at the other ends by the plates 25, 26. Two pairs of suspension plates 27, 28 respectively are attached to extend downwardly from the sides of the plates 25, 26. The feed reel 20 and take-up reel 14 are respectively rotatably supported by the downwardly extending pairs of suspension plates 27, 28. The pressing roller 13 is rotatably supported by arms 29 pivoted to the plates 11, and are pulled rightward by a spring 30 to press the recording paper against the pulling roller 12. A lug 31 is fixed at one side of the plate 25. The recording paper is drawn from the paper roll mounted on the feed reel 20, and moves over the roller 18, the plates 25 and 26, and the roller 12, and is rewound on the take-up reel 14. The recording stylus lead piece is positioned in the path of the stylus 3.

When a new paper roll must be mounted in the recorder, the lug 31 is raised so that the plates 25, 26 respectively are turned up in the directions of arrows, and accordingly provide easy access to the feed and take-up reels 20, 14. After the end of the paper roll mounted on the feed reel 20 is drawn out over the rollers 18, 12 and engaged or fixed on the take-up reel 14, the lug 31 is depressed to lower the plates 25, 26, so that the recorder is restored to a normal writing operational mode.

The above described recorders must always keep the recording stylus in contact with the surface of the recording paper, in order to accurately depict underwater conditions. A spring is often utilized and incorporated in the stylus assembly to insure that the stylus always slides on the surface of the recording paper. Hence, if the recording stylus lead piece is not placed at an appropriate place, the stylus can hook the edge of the recording paper as it slides onto the paper. When dry paper is used, the recording stylus often draws the edge thereof to distort the shape of the paper, since the dry paper is strong and hard to tear. When moist paper is used, the stylus often tears or rips the paper. In order to prevent such damage from occuring, the above recorders have a thin flat piece attached to the plate 15 or to side plate 11, with its head portion curved in the path of the recording stylus, so that the flat piece extends over both the recording paper and the plate 15 or the sending roller 18. The recording stylus lead piece thus shaped as a curved thin flat piece is positioned so close to the plate 15 or the sending roller 18 that it almost presses the paper against the grounded backup member.

When an old paper roll is to be replaced by a new one in the recorders shown in FIGS. 1, 2, 3 and 4, after the plates 15, 25, 26 are turned up, some upper portion of the recording paper out of the new paper roll mounted on the feed reel must be passed between the recording stylus lead piece and the sending roller 18 or the plates 15, 25 and the front end of the paper must be fixed on the take-up reel 14. The plates 15, 25, 26 must then be lowered to restore the recorder to its normal condition. It often occurs, at the time of replacing a paper roll, that the new recording paper extends between the rollers over the recording stylus lead piece without the operator noticing the existence of the lead piece. This missetting of recording paper is realized only after the plates are lowered to their original positions, since the lead piece may easily be forgotten due to its position and size. This missetting of recording paper requires the operator to remove the newly-mounted paper, and to reinstall the paper in place. Such handling of lengthy paper is very troublesome, and the recording stylus lead piece is not easily utilized.

Accordingly, an object of the invention is to provide a recorder having a recording stylus lead piece, wherein a used paper roll can be easily replaced by a new one.

Another object of the invention is to provide a recorder having a recording stylus lead piece utilized in an underwater detection system, wherein a used paper roll can be easily replaced by a new one.

A further object of the invention is to provide a recorder in which a recording stylus lead piece is automatically withdrawn from the path of recording paper when the plate over which the recording paper passes is turned up, and is automatically returned to its original position closely over the paper when the plate is lowered, so that the recorder is restored to a normal writing operational mode.

SUMMARY OF THE INVENTION

In order to achieve these and other objects of the invention, a recorder has recording paper extending around a body with curved surface at an end thereof and a roller, and advances progressively lengthwise. The recorder has at least one recording stylus mounted to move across the width of the recording paper. A lead piece is placed in the path of the recording stylus and extends over the edge of the recording paper for smoothly leading the recording stylus into the recording paper.

In accordance with the invention, the lead piece is rotatably supported, and means are provided for always biasing the lead piece in a direction to withdraw from the path of the recording paper. In addition, an obstruction piece is provided for pushing the biasing means, so as to hold the lead piece over the recording paper.

Other objects and features of the present invention will be described in more detail herein with reference to the accompanying drawings, wherein:

BRIEF DESCRIPTION OF THE DRAWINGS

Throughout the drawings, the same reference numerals are given to like components.

DETAILED DESCRIPTION OF THE PREFERRED EMBODIMENTS

Figure 1:
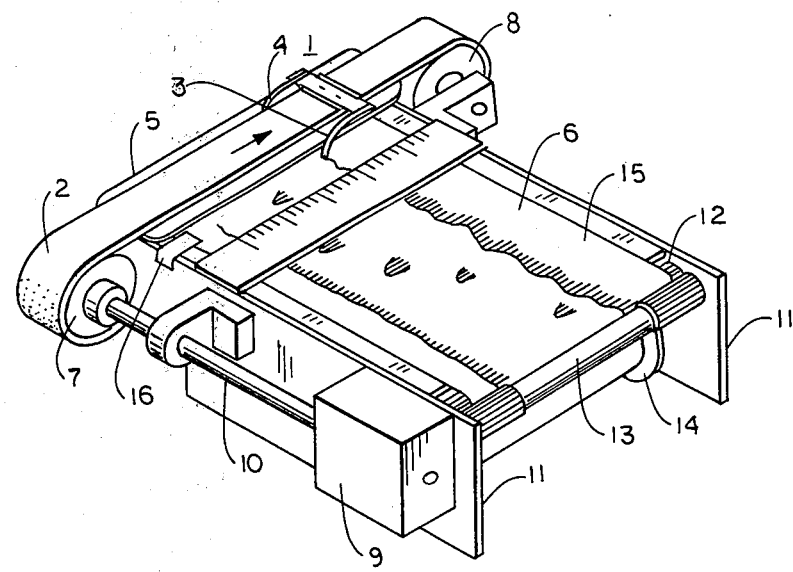
FIG. 1 is a perspective view of a known recorder.
Figure 2:
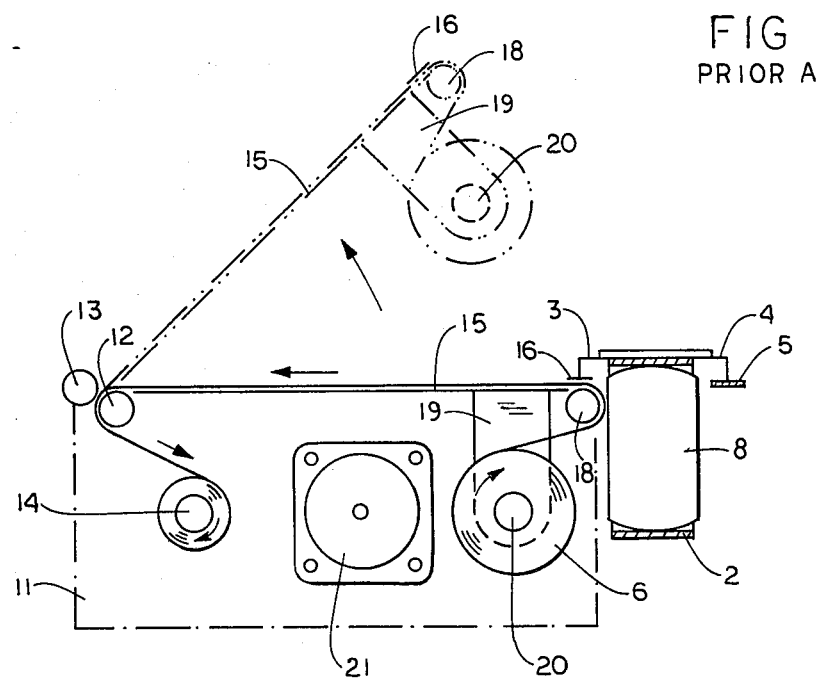
FIG. 2 is a simplified side-view of a known recorder, in which its paper supporting plate can be rotated around the axis of a pulling roller.
Figure 3:
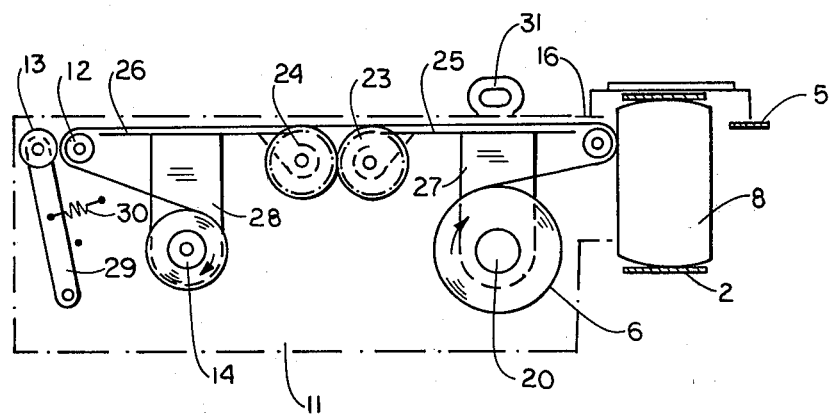
FIG. 3 is a simplified side-view of another recorder in which two paper supporting plates can be rotated upwardly by gears meshed with each other.
Figure 4:
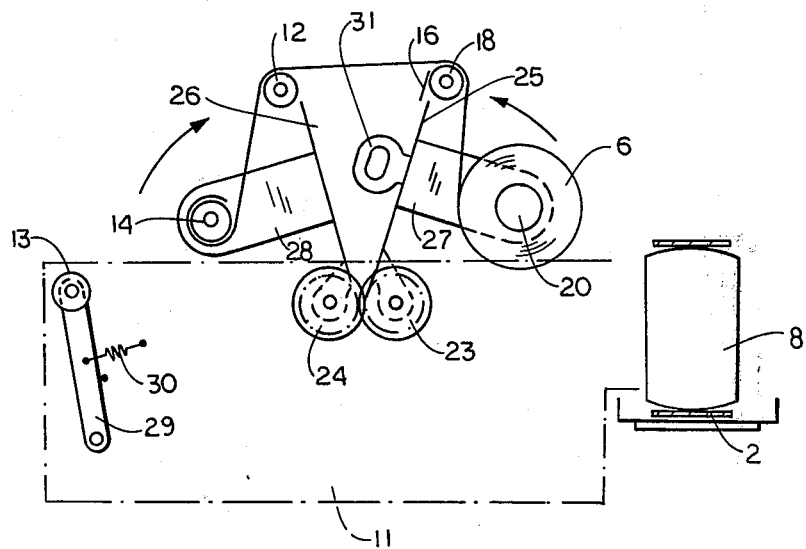
FIG. 4 is a simplified side-view of the recorder shown in FIG. 3, when a new paper roll is to be set thereinto.
Figure 5:
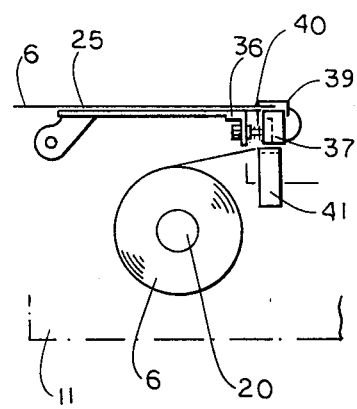
FIG. 5 is a side view of a portion of a recorder according to a first embodiment of the invention, adaptable to the recorder of FIGS. 3 and 4.
Figure 6:
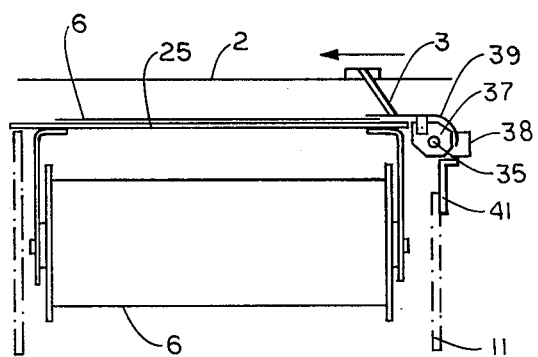
FIG. 6 is a simplified top view of the recorder shown in FIG. 5.

Referring to FIGS. 5, 6, 7 and 8, a rod 35 is attached at its one end to an L-shaped metal piece 36 secured to the underside of the rotatably supported plate 25. A base 37 having a projection 38 is rotatably mounted on the other end of the rod 35. The recording stylus lead piece 39, with a curved outer portion, is held on the base 37. The base 37 is biased to direct the recording stylus lead piece 39 outward, as clearly seen in FIG. 8, by means of an elastic body. For example a spring 40 must be provided surrounding the rod 35 between the L-shaped piece 36 and the base 37. An L-shaped obstruction piece 41 is fixed to the side plate 11.

Figure 7:
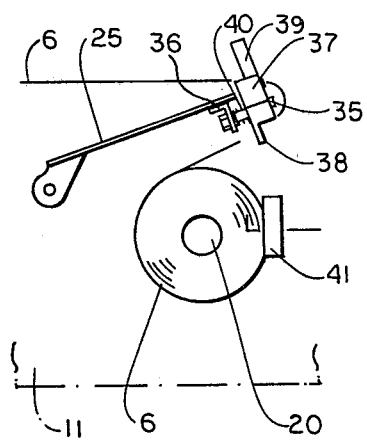
FIG. 7 is a side view of the recorder of FIG. 5 with a new paper roll being set therein.
Figure 8:
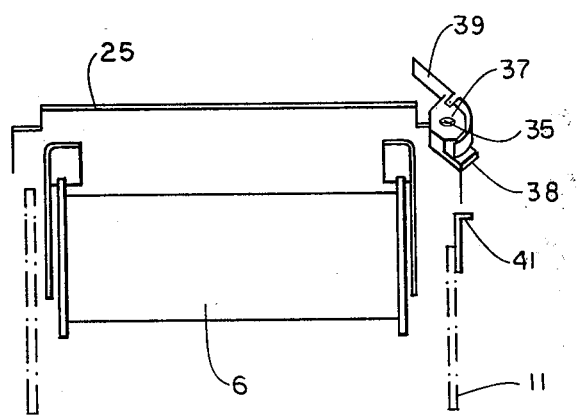
FIG. 8 is a simplified top view of the recorder of FIG. 7.

When the plate 25 is raised in order to mount a new paper roll on the feed-reel, the recording stylus lead piece 39 is automatically rotated out of the path of the recording paper as shown in FIGS. 7 and 8. After the recording paper 6 has been extended from the sending roller 18 to the pulling roller 12, the plate 25 is lowered, and hence the projection 38 of the base 37 is gradually rotated by the L-shaped obstruction piece 41. As a result, all of the recording paper contacts the plate 25, and the recording stylus lead piece 39 finally almost presses the recording paper 6 against the plate 25. Therefore, the recording stylus 3 is guided accurately by the lead piece 39 and can smoothly pass onto the recording paper 6.

Figure 9:
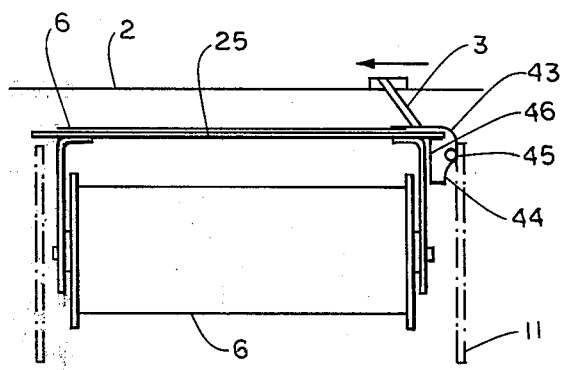
FIG. 9 is a simplified top view of a recorder according to a second embodiment of the invention.
Figure 10:
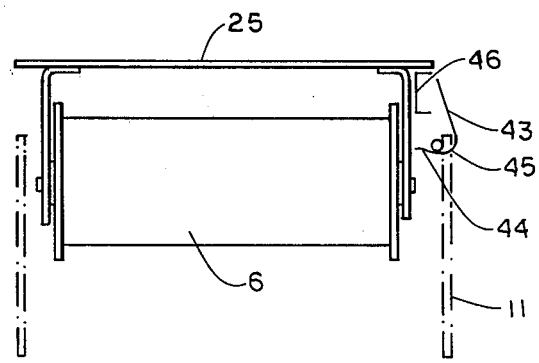
FIG. 10 is a simplified top view of the recorder of FIG. 9, with a new paper roll being installed therein.

Referring to FIGS. 9 and 10, a thin flat recording stylus lead piece 43 having a curved portion 44 is rotatably supported by a bar 45 horizontally secured to the side plate 11. An elastic body, for example a spring (not shown) is also utilized to bias the recording stylus lead piece to direct it outward. At an appropriate part of the underside of the plate 25, a pushing fixture 46 is suitably shaped to push the curved portion 44 of the recording stylus lead piece 43 downward.

When the plate is rotated upwardly in order to change a paper roll, the recording stylus lead piece is automatically withdrawn from the path of the recording paper 6 as shown in FIG. 10. After the recording paper has been extended between the rollers 18, 12, the plate 25 is lowered, and hence the recording stylus lead piece is gradually rotated in a counter clockwise direction by the pushing fixture 46, so that the recording paper finally lies over the plate 25 under the recording stylus lead piece 43 when the plate 25 is restored to its original position.

It should be noted that a weight attached at an appropriate part of the lead piece 39 can be utilized in place of the spring 40 to bias the recording stylus lead piece 39 so as to make it turn away from the path of the recording paper.

It should be noted that a body with curved surface attached to the end of the plates 15, 25 can be used in place of the roller 18.

While the invention has been described in detail and with reference to specific embodiments thereof, it will be apparent to one skilled in the art that various changes and modifications can be made thereto without departing from the spirit and scope of the invention.

What is claimed is:

1. In a recorder having recording paper mounted to advance lengthwise from a body with curved surface to a roller, and having at least one recording stylus mounted to move transversely across the width of the recording paper, with a lead piece placed in the path of the recording stylus extending over the edge of the recording paper for smoothly leading the recording stylus into the recording paper; the improvement wherein:
   (i) said lead piece is rotatably supported on said recorder,
   (ii) means are provided for continuously biasing the lead piece in a direction to withdraw the lead piece from the path of the recording paper, and
   (iii) an obstruction piece is positioned to push said biasing means so as to hold said lead piece to lie over said recording paper.

2. The recorder as defined in claim 1 wherein the means for biasing the lead piece comprises a spring.

3. The recorder as defined in claim 1 wherein the means for biasing the lead piece comprises a weight attached to an appropriate part of said lead piece.

4. In a recorder having a stylus movable across a recording medium wherein the stylus is adapted to cross the edge of the recording medium in a given locus, a lead member is positioned to guide the stylus onto the medium at said locus, and an assembly carrying the recording medium is movably mounted in the recorder between a first position in which the stylus traverses the medium and a second position at which the medium is remote from the stylus; the improvement wherein said lead member comprises a pivotally mounted guide element positioned adjacent said locus, means biasing said guide element away from said medium, and holding means responsive to the positioning of said assembly at said first position to hold said guide element over the edge of said medium at said locus against the force of said biasing means.

5. The recorder of claim 4 wherein said medium comprises an elongated electrically sensitive material extending between a supply roll and a driven roll, said assembly carrying said supply roll and driven roll and being pivotally mounted in said recorder to move said medium to said first position for recording and to said second position for reloading said material.

6. The recorder of claim 5 wherein said guide element comprises a thin strip extending over the edge of said material at said locus when said assembly is in said first position, the end of said strip extending beyond said edge being curved to enable said stylus to be guided by said strip, said strip being pivotally mounted to enable it to withdraw from said material.

7. The recorder of claim 6 wherein said assembly is pivotally mounted in a frame, said strip being pivotally mounted to said frame.

8. The recorder of claim 6 wherein the pivotal mounting for said strip comprises a base affixed to said strip, said base being pivotally mounted and having a projection, said holding means comprising means engaging said projection in said first position of said assembly to hold said strip at its pivotal position extending over the edge of said material.

9. The recorder of claim 6 wherein said assembly is pivotally mounted in a frame, and said holding means is mounted in said frame.

* * * * *